(12) United States Patent
Nakabori et al.

(10) Patent No.: US 6,396,780 B1
(45) Date of Patent: May 28, 2002

(54) INFORMATION STORAGE APPARATUS AND METHOD FOR STORING DATA

(75) Inventors: Tsuyoshi Nakabori, Sayama; Tadao Yamanouchi, Saitama-ken; Changhao Gui, Iruma, all of (JP)

(73) Assignee: TEAC Corporation, Tokyo (JP)

( * ) Notice: Subject to any disclaimer, the term of this patent is extended or adjusted under 35 U.S.C. 154(b) by 0 days.

(21) Appl. No.: 09/388,174

(22) Filed: Sep. 1, 1999

(51) Int. Cl.[7] ................................................. G11B 7/00
(52) U.S. Cl. .................................. 369/44.37; 369/44.35
(58) Field of Search ........................... 369/44.27, 44.28, 369/44.29, 44.41, 44.34, 44.37, 44.35

(56) References Cited

U.S. PATENT DOCUMENTS

| | | | | |
|---|---|---|---|---|
| 4,786,849 A | * | 11/1988 | Tateishi | 369/44.27 |
| 5,065,383 A | * | 11/1991 | Tateishi et al. | 369/44.28 |
| 5,197,058 A | * | 3/1993 | Bell, Jr. et al. | 369/44.28 |
| 5,347,503 A | | 9/1994 | Koyama et al. | |
| 5,363,358 A | | 11/1994 | Yanagawa | |
| 5,796,687 A | * | 8/1998 | Baba | 369/44.29 |
| 5,909,416 A | * | 6/1999 | Matsui | 369/44.41 |

FOREIGN PATENT DOCUMENTS

| | | | | |
|---|---|---|---|---|
| JP | 59-171088 | * | 9/1984 | 369/44.27 |
| JP | 03263621 | | 11/1991 | |
| JP | 04085732 | | 3/1992 | |
| JP | 6-60409 | * | 3/1994 | 369/44.27 |
| JP | 7-235072 | * | 9/1995 | 369/44.41 |
| JP | 0 769 776 A1 | | 4/1997 | |

* cited by examiner

*Primary Examiner*—Nabil Hindi
(74) *Attorney, Agent, or Firm*—Anderson Kill & Olick; Eugene Lieberstein; Michael N. Meller

(57) ABSTRACT

The present invention provides an information storage apparatus generating a tracking error signal in which apparatus and method the differential push-pull method is applied to a three spot method using a main beam and two sub-beams, the main beam for writing data on a recording medium and reading data from the recording medium, the information storage apparatus including the following parts. A beam moving part moves the main beam from a blank track to a recorded track. A center value calculating part calculates a center value of the tracking error signal when said main beam is moved from the blank track to the recorded track so that a reference value of the tracking error signal is corrected in accordance with the center value when said main beam writes data on the recording medium.

8 Claims, 7 Drawing Sheets

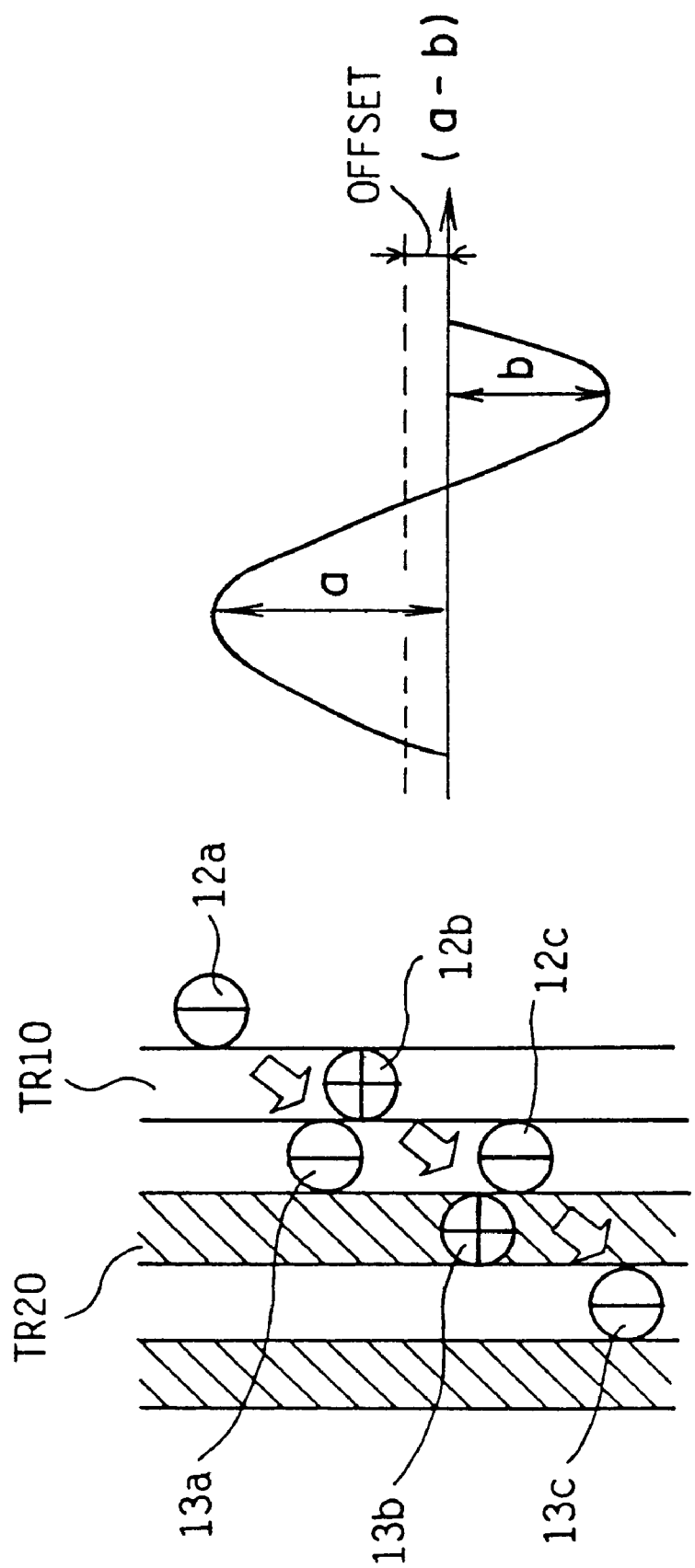

INFORMATION STORAGE APPARATUS AND METHOD FOR STORING DATA

BACKGROUND OF THE INVENTION

1. Field Of The Invention

The present invention generally relates to information storage apparatuses and methods for storing data, and more particularly to an information storage apparatus and a method for storing data in which tracking error signals are generated by the differential push-pull method so as to control tracking.

2. Description Of The Related Art

In an information storage apparatus such as an optical disk device, it is preferable to perform a precise tracking operation in order to write and read data on a preformed track. One of conventional tracking methods is a tracking servo method that employs the differential push-pull method using a main beam and two sub-beams for generating a tracking error signal.

FIG. 1 shows a diagram illustrating an optical system employing the differential push-pull method.

Generally, in the differential push-pull method, a main beam, the first side beam preceding the main beam and the second side beam following the main beam are emitted onto an optical disk.

For example, such an optical system as shown in FIG. 1 can realize the differential push-pull method.

A laser beam emitted by a laser 1 is collimated by a collimator lens 2 and is split into three parallel beams by a diffraction grating 3. The three split beams are supplied to an objective lens 5 through a beam splitter 4.

The objective lens 5 condenses each of these three beams and focuses them on the optical disk 6. These three beams correspond to the main beam MB, the first side beam SB1, and the second side beam SB2.

The three beams are reflected at three spots on the optical disk 6 and are diverted to a condensing lens 7 by the beam splitter 4. The diverted beams, the first side beam, the main beam and the second side beam, are condensed by the condensing lens 7 and supplied to corresponding detectors 8a, 8b and 8c, respectively.

From three signals detected by the detectors 8a, 8b and 8c, three differential signals of the main beam, the first side beam and the second beam are obtained by a detecting circuit so as to generate three tracking signals.

FIG. 2 shows a block diagram illustrating a detecting circuit based on the differential push-pull method.

The detector 8a, which detects a reflected beam of the first side beam SB1, has two segmented detecting areas E2 and F2. The detector 8b, which detects a reflected beam of the main beam MB, has two segmented detecting areas E1 and F1. The detector 8c, which detects a reflected beam of the second side beam SB2, has two segmented detecting areas E3 and F3.

The detecting area E2 of the detector 8a is connected to a non-inverting input terminal of a differential amplifier 9a and the detecting area F2 of the detector 8a is connected to an inverting input terminal of the differential amplifier 9a. The differential amplifier 9a generates a tracking error signal TE2 corresponding to the difference between two signals from the detecting areas E2 and F2. That is, the tracking error signal TE2 corresponds to a tracking spot of the first side beam SB1.

The detecting area E1 of the detector 8b is connected to a non-inverting input terminal of a differential amplifier 9b and the detecting area F1 of the detector 8b is connected to an inverting input terminal of the differential amplifier 9b. The differential amplifier 9b generates a tracking error signal TE1 corresponding to the difference between two signals from the detecting areas E1 and F1. That is, the tracking error signal TE1 corresponds to a tracking spot of the main beam MB.

The detecting area E3 of the detector 8c is connected to a non-inverting input terminal of a differential amplifier 9c and the detecting area F3 of the detector 8c is connected to an inverting input terminal of the differential amplifier 9c. The differential amplifier 9c generates a tracking error signal TE3 corresponding to the difference between two signals from the detecting areas E3 and F3. That is, the tracking error signal TE3 corresponds to a tracking spot of the second side beam SB2.

The tracking error signal TE2 generated by the differential amplifier 9a and the tracking error signal TE3 generated by the differential amplifier 9c are supplied to an adder 10 that generates an added tracking error signal, which is the result of adding (TE2+TE3) the tracking error signals TE2 and TE3. The added tracking error signal (TE2+TE3) from the adder 10 is supplied to an inverting input terminal of a differential amplifier 11.

The signal generated by the differential amplifier 9b, that is, the tracking error signal TE1 of the main beam MB, is supplied to a non-inverting input terminal of the differential amplifier 11. The differential amplifier 11 generates another tracking error signal, which is a signal {TE1−(TE2+TE3)}, by subtracting the added tracking error signal (TE2+TE3) from the tracking error signal TE1.

As mentioned above, the final tracking error signal is generated by applying the differential push-pull method to the main beam and also the first and the second side beams. It should be noted that the same offset, which is caused by objective lens shift or radial skew, occurs in the original three tracking error signals TE1, TE2 and TE3 for the main beam MB, the first side beam SB1 and the second side beam SB2 because the same objective lens 5 is used. Thus, the final tracking error is without the offset caused by objective lens shift or radial skew.

Referring to FIG. 2, a spot 10b focused on by the main beam MB is positioned on a track TR0, a spot 10a focused on by the first beam SB1 is positioned on a guard band GB10 that is not used except as a space between the track TR0 and a track TR1, and a spot 10c focused on by the second beam SB2 is positioned on a guard band GB20 that is not used except as a space between the track TR0 and a track TR2.

In a conventional tracking servo method employing the above-mentioned differential push-pull method, it is assumed that the optical system in FIG. 1 operates on recorded tracks on which many pits P are formed on tracks TR0, TR1 and TR2. In this case, reflectance of the spot 10a nearly equals reflectance of the spot 10c because both spots 10a and 10c include parts of pits. Accordingly, there is no unbalance between two reflected beams from the spots 10a and 10c so that the offset caused by objective lens shift or radial skew is eliminated.

However, the conventional tracking servo method has a disadvantage that will now be explained.

FIG. 3 shows a diagram illustrating a case of causing an offset that should be eliminated.

Referring to FIG. 3, it is assumed that the optical system in FIG. 1 is operating around a boundary between a recorded area and a blank area. That is, the first side beam SB1 focuses on a spot 11a on the guard band GB10 in the blank area in which there is no pit and the second side beam SB2 focuses on a spot 11c on the guard band GB20 in the recorded area in which there are many pits P. Accordingly, the presence of a pit P in the spots 11a and 11c affects both reflectances of the first side beam SB1 and the second side beam SB2. Thus, unbalance between the reflectances occurs. Although the unbalance does not cause an offset directly, the offset can not be eliminated when objective lens shift or radial skew occurs simultaneously. In practice, the optical disk 6 is not flat and is not always mounted rigidly parallel to the focal plane.

Disadvantageously, a center of a peak value and a bottom value of a tracking error signal including the offset does not indicate a center of a track. Hence, data is recorded away from the center of the track because a tracking servo adjusts tracking by the offset so that a de-tracking is caused.

SUMMARY OF THE INVENTION

It is a general object of the present invention to provide an information storage apparatus and a method for storing data in which the above-mentioned problems are eliminated.

A more specific object of the present invention is to provide an information storage apparatus and a method for storing data which apparatus and method are capable of suppressing offsets of tracking error signals by a median of a peak value and a bottom value of a tracking error signal being obtained and data being recorded in accordance with the median especially in a case of operating around a boundary between a recorded area and a blank area.

The above objects of the present invention are achieved by an information storage apparatus generating a tracking error signal in which apparatus the differential push-pull method is applied to a three spot method using a main beam and two sub-beams, the main beam for writing data on a recording medium and reading data from the recording medium, the information storage apparatus including: a beam moving part moving the main beam from a blank track to a recorded track; and a center value calculating part calculating a center value of the tracking error signal when the main beam is moved from the blank track to the recorded track so that a reference value of the tracking error signal is corrected in accordance with the center value when the main beam writes data on the recording medium.

According to the present invention, it is possible to correct the tracking error signal generated around the boundary between the blank track and the recorded track in accordance with the center value. Therefore, an offset caused by the tracking error signal can be eliminated, which results in prevention of data from being recording off-track.

The center value calculating part according to the present invention may detect a peak value and a bottom value of the tracking error signal generated when the main beam is moved by the beam moving part, and calculate a median between the peak value and the bottom value so that the median is defined as the center value of the tracking error signal.

According to the present invention, the median calculated from the tracking error signal is set as the center value of the tracking error signal so as to correct the tracking error signal. Therefore, an offset caused by the tracking error signal can be eliminated.

Alternately, the center value calculating part according to the present invention may obtain a predetermined number of medians by the beam moving part operating the main beam at predetermined times and a median between a peak value and a bottom value of the tracking error signal being calculated every time the beam moving part operates the main beam so that an average of the medians is defined as the center value of the tracking error signal.

According to the present invention, the average of medians is defined as a center value of the tracking error signal. Therefore, it is possible to more accurately correct the tracking error signal in accordance with the center value so that an offset caused by the tracking error signal can be eliminated and it is possible to prevent a tracking servo from erroneously adjusting a position on a track by the offset.

The beam moving part according to the present invention is executed by a still regenerative command that operates the main beam to read data recorded on the recording medium and regenerate the data.

Moreover, the above objects of the present invention are achieved by a method for storing data in accordance with a tracking error signal in which method the differential push-pull method is applied to a three spot method using a main beam and two sub-beams, the main beam for writing data on a recording medium and reading data from the recording medium, the method comprising the steps of: (a) moving a main beam from a blank track to a recorded track; (b) calculating a center value of the tracking error signal generated when the main beam is moved from the blank track to the recorded track in the step (a); and (c) correcting a reference value of the tracking error signal in accordance with the center value when the main beam writes data on the recording medium.

According to the present invention, it is possible to correct the tracking error signal generated around the boundary between the blank track and the recorded track in accordance with the center value. Therefore, an offset caused by the tracking error signal can be eliminated, which results in prevention of data from being recorded off-track.

The step (b) according to the present invention may include the steps of: (d) detecting a peak value and a bottom value of the tracking error signal; (e) calculating a median between the peak value and the bottom value detected in the step (d); and (f) defining the median as the center value of the tracking error signal so as to correct the tracking error signal.

According to the present invention, the median calculated from the tracking error signal is set as the center value of the tracking error signal so as to correct the tracking error signal. Therefore, an offset caused by the tracking error signal can be eliminated.

Alternately, the step (b) according to the present invention may include the steps of: obtaining a predetermined number of medians by the step (a) being performed at predetermined times and a median between a peak value and a bottom value of a tracking error signal being calculated every time the step (a) is performed; and defining an average of the medians as the center value of the tracking error signal so as to correct the tracking error signal.

According to the present invention, the average of medians is defined as a center value of the tracking error signal. Therefore, it is possible to more accurately correct the tracking error signal in accordance with the center value so that an offset caused by the tracking error signal can be eliminated and it is possible to prevent a tracking servo from erroneously adjusting a position on a track by the offset.

BRIEF DESCRIPTION OF THE DRAWINGS

Other objects, features and advantages of the present invention will become more apparent from the following detailed description when read in conjunction with the accompanying drawings, in which:

FIG. 7A is a schematic illustration showing an operation of laser beams on an optical disk for tracking according to the embodiment of the present invention and FIG. 7B is a graphical representation showing a tracking error signal caused by a track jump operation according to the embodiment of the present invention.

DESCRIPTION OF THE PREFERRED EMBODIMENTS

Figure 4:
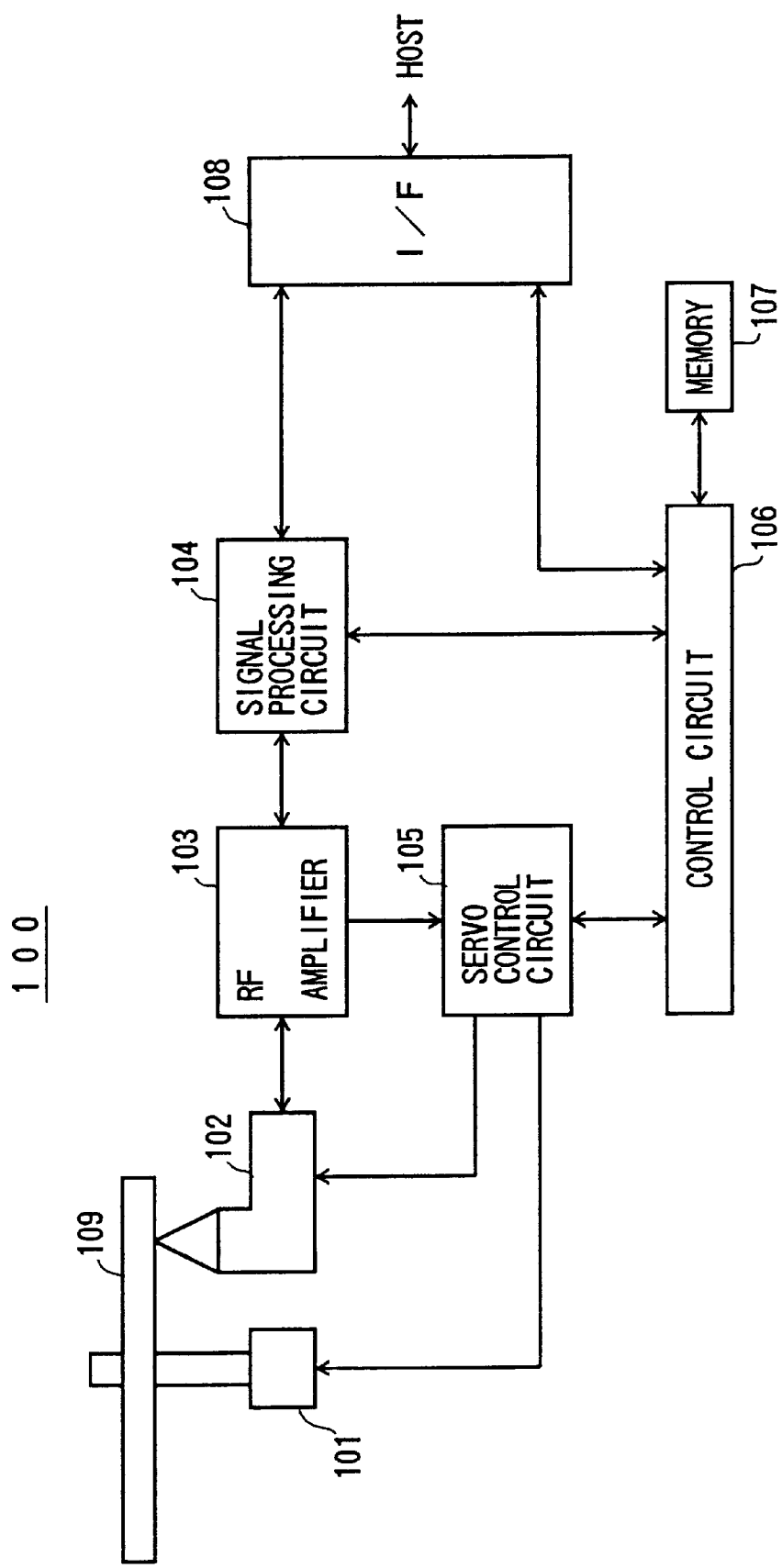
FIG. 4 shows a block diagram illustrating a constitution according to an embodiment of the present invention.

FIG. 4 shows a block diagram illustrating a constitution according to an embodiment of the present invention.

An information storage apparatus 100 in the embodiment includes a spindle motor 101, an optical system 102, an RF amplifier 103, a signal processing circuit 104, a servo control circuit 105, a control circuit 106, a memory 107, an interface 108, and an optical disk 109.

The spindle motor 101 is engaged with the optical disk 109 and rotates the optical disk 109.

Figure 1:
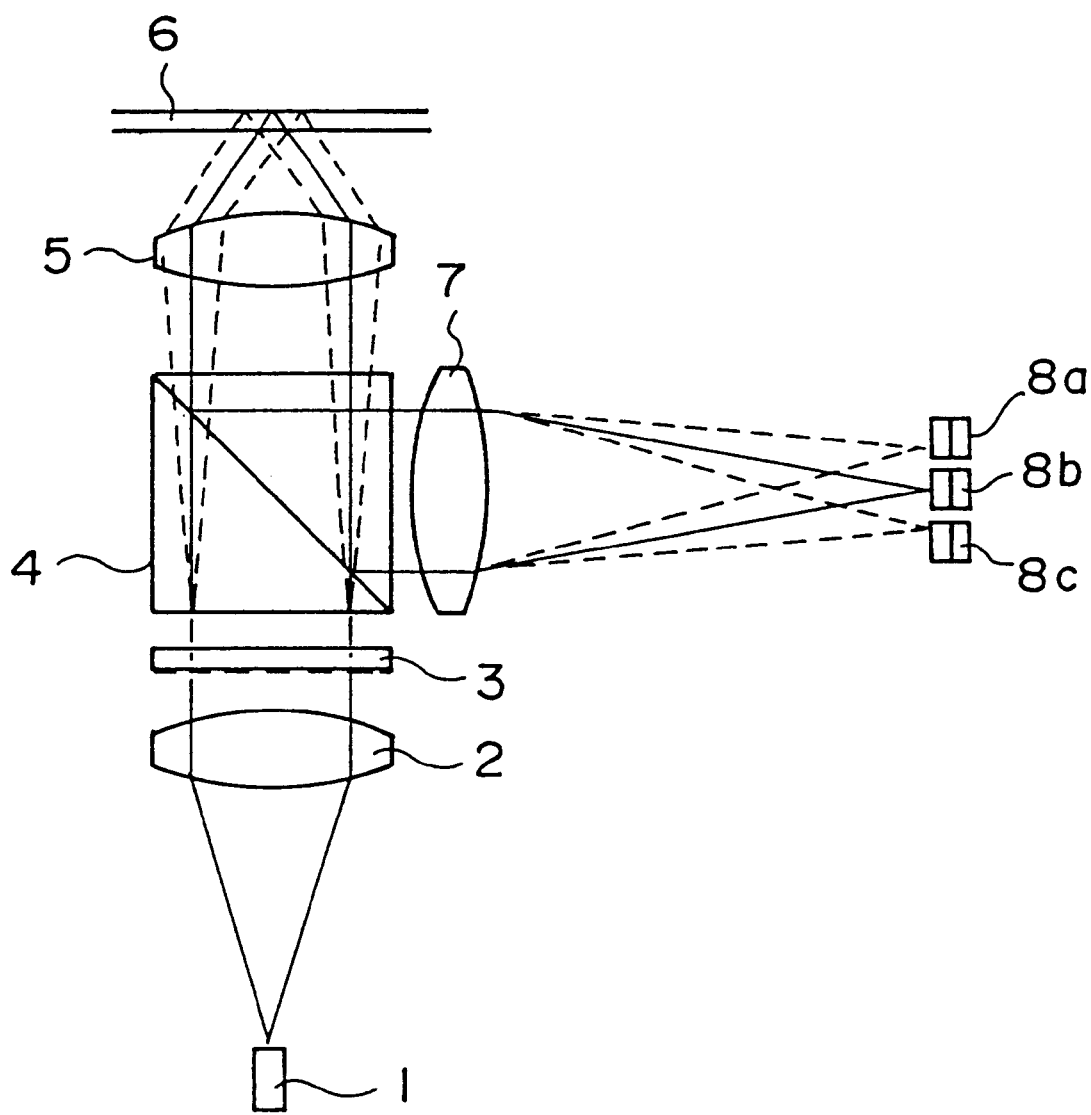
FIG. 1 shows a diagram illustrating an optical system employing the differential push-pull method.
Figure 2:
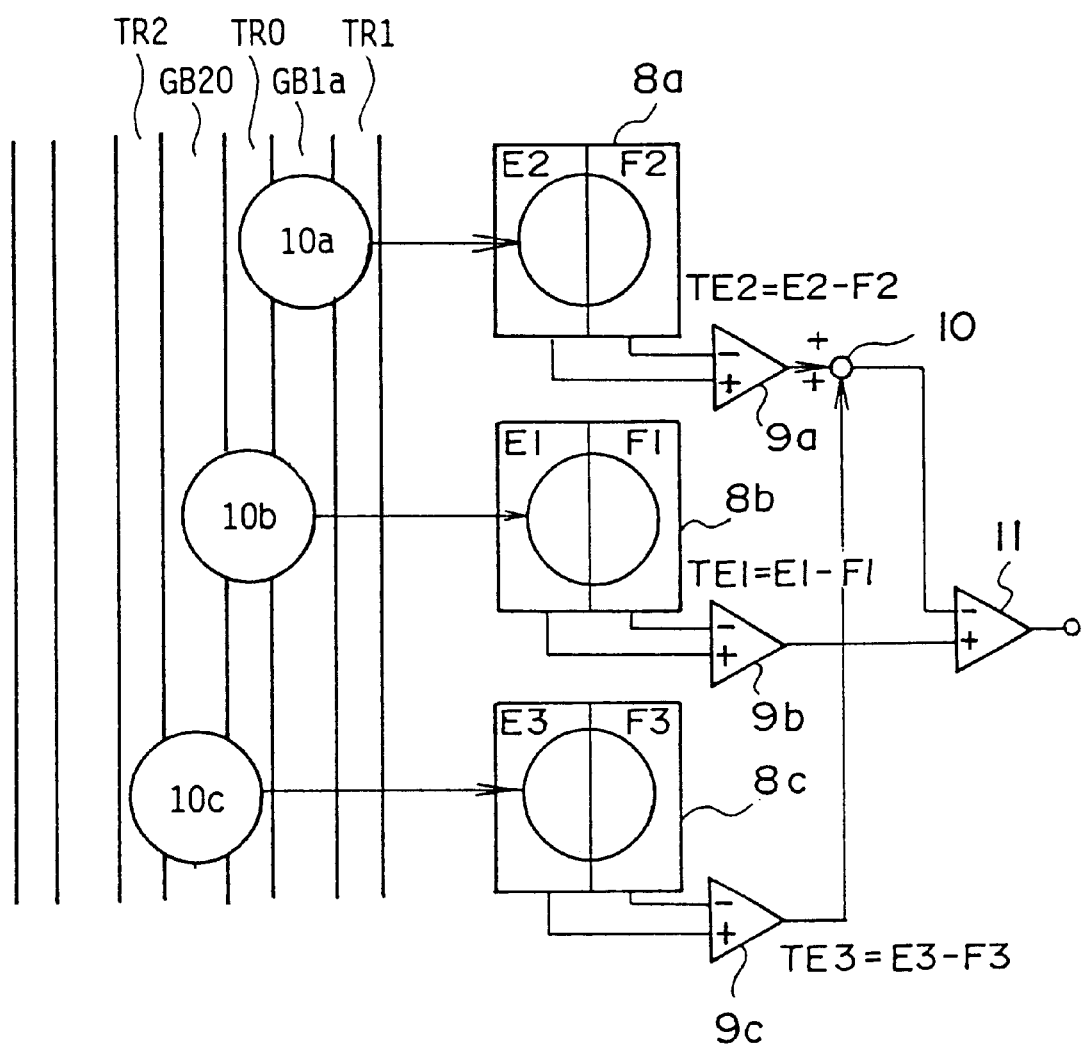
FIG. 2 shows a block diagram illustrating a detecting circuit based on the differential push-pull method.
Figure 3:
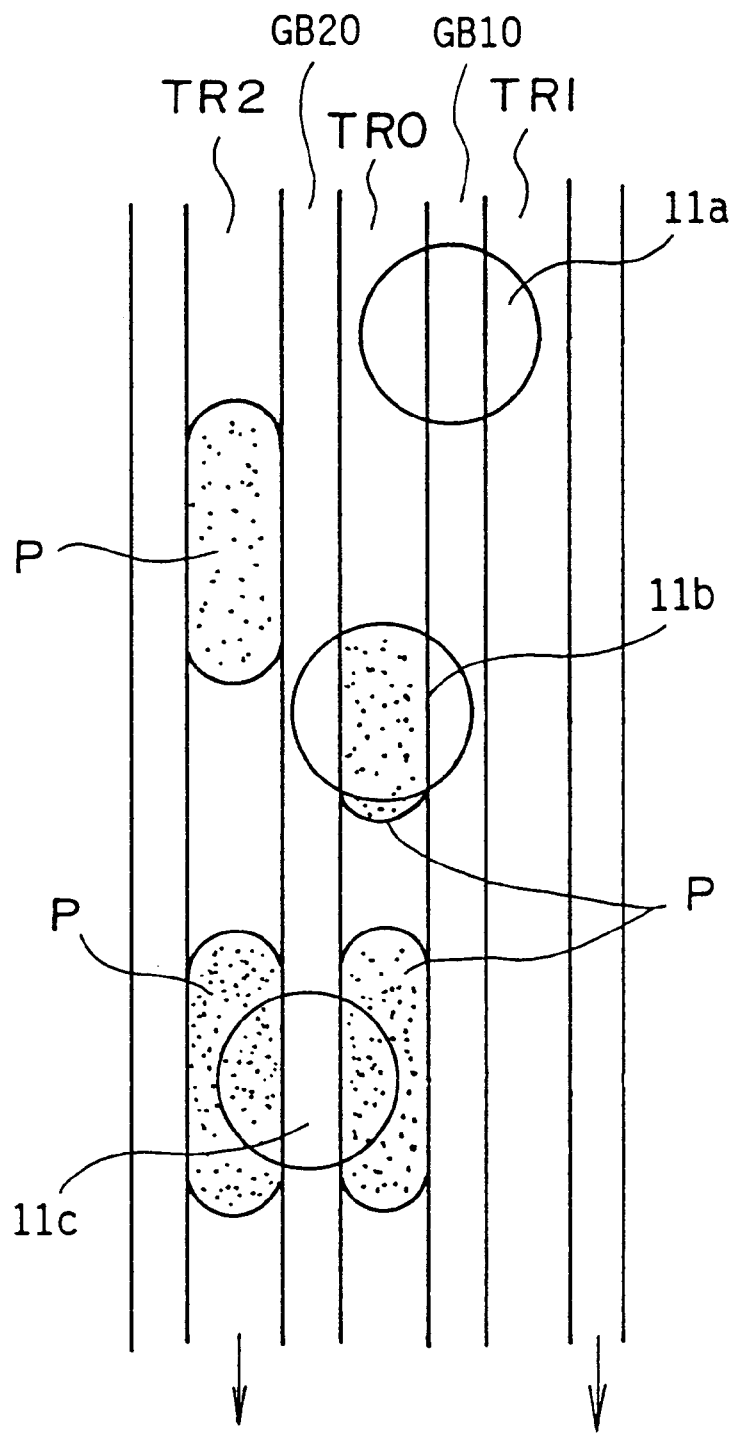
FIG. 3 shows a diagram illustrating a case of causing an offset that should be eliminated.

The optical system 102 includes the same constitution as the optical system as shown in FIG. 1. In addition, the optical system 102 focuses laser beams on the optical disk 109 and simultaneously detects reflected beams. Subsequently, the optical system 102 generates a tracking error signal, a focus error signal, and a reading signal. The tracking error signal is generated in accordance with shift in radial direction of the optical disk 109, which is distance between the desired position and a spot focused on by a laser beam. The focus error signal is generated in accordance with the amount of defocus on the optical disk 109. The reading signal is generated in accordance with pits formed on tracks of the optical disk 109.

The RF amplifier 103 amplifies signals detected by the optical system 102. The detected signals are supplied to the signal processing circuit 104 and the servo control circuit 105.

The control circuit 106 operates to regenerate data recorded on the optical disk 109. In addition, the present invention has a feature such that when power is turned on, or at a period of a predetermined time, laser beams are allowed to move back and forth around a boundary between a recorded area and a blank area and to detect tracking error signals so that medians of the peak and bottom values of the tracking error signals are obtained and a reference value is defined in accordance with the obtained medians. The process of defining the reference value for the tracking error signal will be explained later.

The defined reference value is stored in the memory 107.

Figure 5:
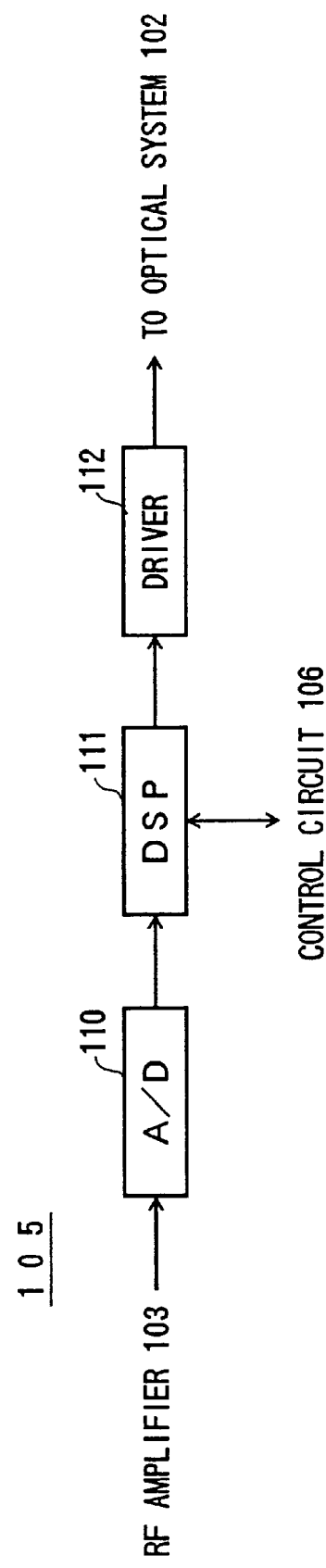
FIG. 5 shows a block diagram illustrating an essential construction of a servo control circuit according to the embodiment of the present invention.

FIG. 5 shows a block diagram illustrating an essential construction of the servo control circuit according to the embodiment of the present invention.

In this embodiment, the servo control circuit 105 includes an A/D converter circuit 110, a DSP (Digital Signal Processor) circuit 111, and a driver 112.

The A/D converter circuit 110 receives an analog signal as a tracking error signal and then converts the received analog signal into a digital data signal. Consequently, the digital data signal is supplied as the tracking error signal to the DSP circuit 111.

The DSP circuit 111 corrects an error of the digital data signal supplied by the A/D converter circuit 110 in accordance with the reference value that is obtained by the control circuit 106. The tracking error signal corrected by the DSP circuit 111 is supplied to the driver 112.

The driver 112 controls an actuator moving the optical system 102 in the radial direction of the optical disk 109 in order to return the error of the tracking signal supplied from the DSP circuit 111 to zero.

A method for obtaining the reference value, which is used to correct an error of a tracking error signal by the control circuit 106, will now be explained.

Figure 6:
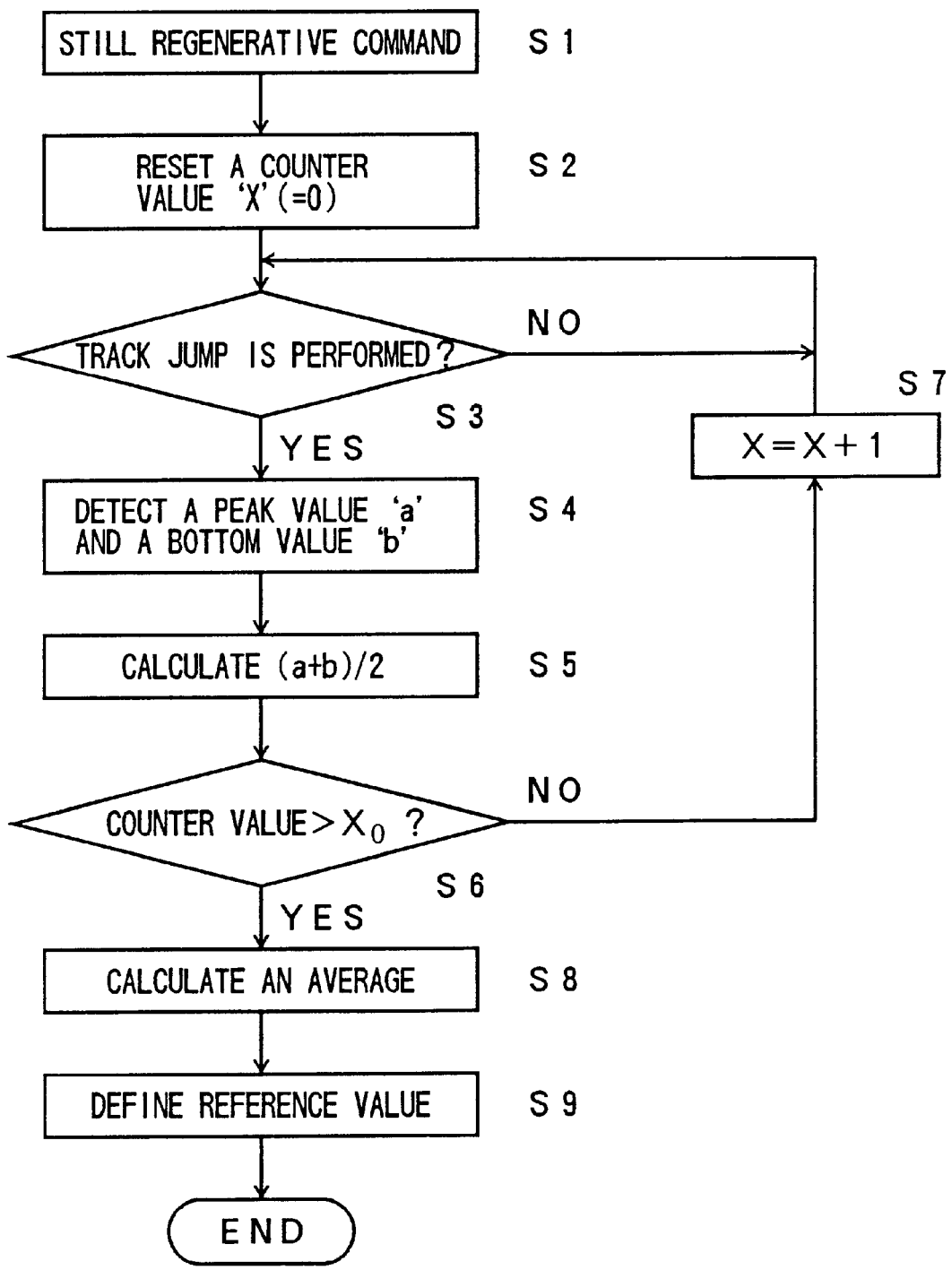
FIG. 6 shows a flowchart diagram explaining the method for obtaining a reference value in a control circuit according to the embodiment of the present invention.

FIG. 6 shows a flowchart diagram explaining the method for obtaining the reference value in the control circuit according to the embodiment of the present invention.

The control circuit 106 executes a still regenerative command to search for the last location of a recorded area on the optical disk 109 in order to move the optical system 102 thereto in step S1. Then, a counter value 'X' is reset (X=0) in step S2.

After the counter value is reset, when the control circuit 106 recognizes that a track jump operation is performed (step S3), the control circuit 106 detects a peak value 'a' and a bottom value 'b' of a tracking error signal in step S4.

Subsequently, a median between the peak value 'a' and the bottom value 'b' is calculated and stored in the memory 107 in step S5.

The counter value 'X' is compared with a predetermined value '$X_0$' in step S6. It should be noted that the predetermined value '$X_0$' indicates the number of sampling times used to calculate an average of medians of tracking error signals and also indicates the number of times to perform the track jump operation by the still regenerative command.

When the counter value 'X' is less than the value '$X_0$' in the step S6, the counter value 'X' is incremented by 1 in step S7 and then the process goes to the step 3.

When the counter value 'X' is greater than or equal to the value '$X_0$' in the step S6, the average of the number '$X_0$' of medians, which are stored in the memory 107 in the step S5, is calculated in step S8. The average is stored as a reference value in step S9.

It should be noted that the still regenerative command is generally used to search for the last location of a recorded area. The still regenerative command moves the optical system back and forth around the boundary between the recorded area and the blank area on the optical disk at predetermined times. Thus, in this embodiment, the operation of the still regenerative command is utilized to sample some tracking error signals around the boundary.

FIG. 7A is a schematic illustration showing an operation of laser beams on the optical disk for tracking according to the embodiment of the present invention.

In this figure, a track TR10 is located in a blank area and a track TR20 is located in a recorded area. The track TR10 and TR20 are adjacent to each other near the boundary between the recorded area and the blank area. It is assumed that the optical system moves from the blank area to the recorded area. Spots 12a, 12b and 12c are focused on by the first side beam SB1, the main beam MB and the second side beam SB2, respectively, when the optical system 102 focuses on the track TR10. After the track jump operation by the still regenerative command, spots 13a, 13b and 13c are focused on by the first side beam SB1, the main beam MB and the second side beam SB2, respectively, when the optical system 102 focuses on the track TR20.

FIG. 7B is a graphical representation showing a tracking error signal caused by the track jump operation according to the embodiment of the present invention.

The track jump operation from a track in the blank area to a track in the recorded area causes the tracking error signal as shown in FIG. 7B.

Specifically, there is no pit formed on a track in the blank area and reflectance of a laser beam on the track in the blank area is higher so that an amplitude 'a' of the tracking error signal as the peak value is bigger. On the contrary, there are many pits formed on a track in the recorded area and reflectance of a laser beam on the track in the recorded area is lower so that an amplitude 'b' of the tracking error signal as the bottom value is smaller.

Therefore, the tracking error signal causes an offset (a–b).

The control circuit 106 obtains the median of the peak value and the bottom value of a tracking error signal sampled every time the track jump operation is performed. The operation as shown in FIG. 7A is performed the number '$X_0$' of times due to sampling a tracking error signal around the boundary. After deciding the reference value that is the average of a plurality of medians, the control circuit 106 corrects an error of the tracking error signal such that the reference value is a center of the corrected signal.

It should be noted that the above-mentioned correction of the tracking error signal is performed while the optical system 102 is recording data on the optical disk 109. That is, this is a case in which the first side beam SB1 scans the track TR10 in the blank area and the second side beam SB2 scans the track TR20 in the recorded area. Conversely, the correction of the tracking error signal is not performed while the optical system 102 is reading data recorded on the optical disk 109, that is, while both of the first and the second side beams scan in the recorded area.

According to the embodiment, in the case in which the first side beam SB1 preceding the main beam MB scans the track TR10 in the blank area and the second side beam SB2 following the main beam MB scans the track TR20 in the recorded area, a tracking error signal generated by a reflective difference between the track TR10 and the track TR20 is corrected by obtaining the offset. That is, the offset is eliminated by correcting the tracking error signal. Therefore, the present invention can prevent the optical system 102 from recording data at an off-track position that is adjusted by the offset. In addition, a noise caused by wobble grooves formed on a compact disk such as a CD-R or the like does not affect a RF signal so that deterioration of recording quality can be prevented.

In the embodiment, a tracking error signal is converted into a digital signal and the digital signal is corrected to eliminate an offset. Alternately, a peak-hold circuit or a bottom-hold circuit may be applied for an analog signal.

Moreover, in the embodiment, the track jump operation is applied to taking samples of tracking error signals. Alternately, an operation controlling the optical device to move back and forth around the boundary between the blank area and the recorded area on the optical disk such as a seeking operation may be applied.

The present invention is not limited to the specifically disclosed embodiments, variations and modifications, and other variations and modifications may be made without departing from the scope of the present invention.

The present application is based on Japanese Priority Application No. 10-250101 filed on Sep. 3, 1998, the entire contents of which are hereby incorporated for reference.

What is claimed is:

1. An information storage apparatus generating a tracking error signal in accordance with the differential push-pull method using a main beam and two sub-beams, the main beam for writing data on a recording medium and reading data from the recording medium, said information storage apparatus comprising:

a beam moving part moving said main beam between a track in a blank area and a track in a recorded area; and a center value calculating part calculating a center value of the tracking error signal in which said two sub-beams are emitted on said blank area and said recorded area, respectively, when said main beam is moved by said beam moving part so that a reference value of the tracking error signal is corrected in accordance with the center value when said main beam writes data on the recording medium.

2. The information storage apparatus as claimed in claim 1, wherein said center value calculating part detects a peak value and a bottom value of said tracking error signal generated when the main beam is moved by said beam moving part and calculates a median between the peak value and the bottom value so that the median is defined as the center value of said tracking error signal.

3. The information storage apparatus as claimed in claim 1, wherein said center value calculating part obtains a predetermined number of medians by said beam moving part operating the main beam at predetermined times and a median between a peak value and a bottom value of the tracking error signal being calculated every time said beam moving part operates the main beam so that an average of the medians is defined as the center value of the tracking error signal.

4. The information storage apparatus as claimed in claim 1, wherein said beam moving part is executed by a still regenerative command that operates to read data recorded on the recording medium and regenerate the data.

5. A method for storing data in accordance with a tracking error signal generated in accordance with the differential push-pull method using a main beam and two sub-beams, the main beam for writing data on a recording medium and reading data from the recording medium, said method comprising the steps of:

(a) moving a main beam between a track in a blank area and a track in a recorded area;

(b) calculating a center value of the tracking error signal generated in which said two sub-beams are emitted on said blank area and said recorded area, respectively, when said main beam is moved in the step (a); and (c) correcting a reference value of the tracking error signal in accordance with the center value when said main beam writes data on the recording medium.

6. The method as claimed in claim 5, wherein said step (b) comprises the steps of:
- (d) detecting a peak value and a bottom value of said tracking error signal;
- (e) calculating a median between the peak value and the bottom value detected in the step (d); and
- (f) defining the median as the center value of said tracking error signal so as to correct said tracking error signal.

7. The method as claimed in claim 5, wherein said step (b) comprises the steps of:

obtaining a predetermined number of medians by said step (a) being performed at predetermined times and a median between a peak value and a bottom value of a tracking error signal being calculated every time said step (a) is performed; and defining an average of the medians as the center value of the tracking error signal so as to correct said tracking error signal.

8. The method as claimed in claim 5, wherein said step (a) is executed by a still regenerative command that operates to read data recorded on the recording medium and to regenerate the data.

* * * * *

UNITED STATES PATENT AND TRADEMARK OFFICE
CERTIFICATE OF CORRECTION

PATENT NO. : 6,396,780 B1
DATED : May 28, 2002
INVENTOR(S) : Tsuyoshi Nakabori et al.

It is certified that error appears in the above-identified patent and that said Letters Patent is hereby corrected as shown below:

<u>Title page,</u>
Insert Item [30] after Item [22] as follows:
-- [30] Foreign Application Priority Data
September 3, 1998     [JP]     10-250101 --

Signed and Sealed this

Nineteenth Day of August, 2003

JAMES E. ROGAN
*Director of the United States Patent and Trademark Office*